United States Patent
Fields et al.

(10) Patent No.: US 6,440,546 B1
(45) Date of Patent: Aug. 27, 2002

(54) GLOSS-ADJUSTING MASK LAYER WITH PARTICULATE FILLER

(75) Inventors: Thomas Randall Fields, Charlotte, NC (US); Scott William Huffer, Lancaster, SC (US)

(73) Assignee: Ream Industries Corp., Charlotte, NC (US)

(*) Notice: Subject to any disclaimer, the term of this patent is extended or adjusted under 35 U.S.C. 154(b) by 0 days.

(21) Appl. No.: 09/417,506

(22) Filed: Oct. 13, 1999

(51) Int. Cl.⁷ .................................................. B32B 5/16
(52) U.S. Cl. ................... 428/220; 428/323; 428/328; 428/329; 428/331; 428/332; 428/337; 428/339; 428/409; 428/423.7; 428/424.2; 428/474.9; 428/475.5; 428/475.8; 428/515; 428/518; 428/923; 428/926
(58) Field of Search ...................... 428/220, 323, 428/331, 328, 329, 332, 337, 339, 423.7, 424.2, 474.9, 475.5, 475.8, 515, 518, 923, 926, 409

(56) References Cited

U.S. PATENT DOCUMENTS

| | | |
|---|---|---|
| 4,101,698 A | 7/1978 | Dunning et al. |
| 4,271,217 A | 6/1981 | Tanaka et al. |
| 4,355,071 A | 10/1982 | Chang |
| 4,636,438 A | 1/1987 | Hudson et al. |
| 4,678,690 A | 7/1987 | Palmer et al. |
| 4,769,100 A | 9/1988 | Short et al. |
| 4,818,589 A | 4/1989 | Johnson et al. |
| 4,824,506 A | 4/1989 | Hoerner et al. |
| 4,828,637 A | 5/1989 | Mentzer et al. |
| 4,832,991 A | 5/1989 | Hayward et al. |
| 4,838,973 A | 6/1989 | Mentzer et al. |
| 4,868,030 A | 9/1989 | Mentzer et al. |
| 4,902,557 A | 2/1990 | Rohrbacher |
| 4,913,760 A | 4/1990 | Benson et al. |
| 4,913,970 A | 4/1990 | Hayward et al. |
| 4,931,324 A | 6/1990 | Ellison et al. |
| 4,933,237 A | 6/1990 | Krenceski et al. |
| 4,936,936 A | 6/1990 | Rohrbacher |
| 4,943,680 A | 7/1990 | Ellison et al. |
| 4,957,802 A | 9/1990 | Mentzer et al. |
| 4,959,189 A | 9/1990 | Rohrbacher et al. |
| 4,976,896 A | 12/1990 | Short et al. |
| 5,000,809 A | 3/1991 | Adesko et al. |

(List continued on next page.)

FOREIGN PATENT DOCUMENTS

| | | |
|---|---|---|
| EP | 0 356 924 A2 | 3/1990 |
| EP | 0 388 932 | 3/1990 |
| EP | 0768354 A2 | 4/1997 |
| EP | 0839886 A2 | 5/1998 |
| JP | 04 070339 A | 3/1992 |
| JP | 05 309807 A | 11/1993 |
| WO | WO 94/03337 | 2/1994 |
| WO | WO 97/34850 | 9/1997 |
| WO | WO 97/46377 | 12/1997 |
| WO | WO 97/48776 | 12/1997 |
| WO | WO 99/08870 | 2/1999 |

*Primary Examiner*—Hoa T. Le
(74) *Attorney, Agent, or Firm*—Alston & Bird LLP

(57) ABSTRACT

The flexible, weatherable decorative sheet material provided by the present invention comprises a thermoformable decorative paint film having an inner surface and a weatherable, low gloss outer surface suitable for forming an exterior finish for a part, such as an automobile body part. The sheet material further includes an extensible mask layer releasably adhered to the outer surface of the paint film to form a protective film overlying the paint film. The mask layer comprises a film-forming polymer component and a particulate filler, such as silica, dispersed in the polymer component. A method of constructing the decorative sheet material, a method of controlling the gloss appearance of a paint film, and a composite shaped part including the decorative sheet material are also provided.

28 Claims, 9 Drawing Sheets

U.S. PATENT DOCUMENTS

| | | |
|---|---|---|
| 5,026,448 A | 6/1991 | Reafler et al. |
| 5,030,514 A | 7/1991 | Hartman |
| 5,034,269 A | 7/1991 | Wheeler |
| 5,034,275 A | 7/1991 | Pearson et al. |
| 5,049,442 A | 9/1991 | Panush |
| 5,055,346 A | 10/1991 | Rohrbacher |
| 5,114,789 A | 5/1992 | Reafler |
| 5,125,994 A | 6/1992 | Harasta et al. |
| 5,127,974 A | 7/1992 | Tomiyama et al. |
| 5,139,854 A | 8/1992 | Johnson |
| 5,192,609 A | 3/1993 | Carroll, Jr. |
| 5,203,941 A | 4/1993 | Spain et al. |
| 5,215,811 A | 6/1993 | Reafler et al. |
| 5,215,826 A | 6/1993 | Shimanski et al. |
| 5,268,215 A | 12/1993 | Krenceski et al. |
| 5,342,666 A | 8/1994 | Ellison et al. |
| 5,514,427 A | 5/1996 | Ellison et al. |
| 5,518,786 A | 5/1996 | Johnson et al. |
| 5,536,539 A | 7/1996 | Ellison et al. |
| 5,538,576 A | 7/1996 | Knop et al. |
| 5,601,917 A | 2/1997 | Matsui et al. |
| 5,612,135 A | 3/1997 | Matsui et al. |
| 5,639,536 A | 6/1997 | Yamazaki et al. |
| 5,653,927 A | 8/1997 | Flynn et al. |
| 5,662,977 A | 9/1997 | Spain et al. |
| 5,686,186 A | 11/1997 | Enlow et al. |
| 5,707,697 A | 1/1998 | Spain et al. |
| RE35,739 E | 2/1998 | Ellison et al. |
| 5,716,667 A | 2/1998 | Kashiwada et al. |
| 5,725,712 A | 3/1998 | Spain et al. |
| 5,744,240 A | 4/1998 | Lane et al. |
| 5,747,132 A | 5/1998 | Matsui et al. |
| 5,750,234 A | 5/1998 | Johnson et al. |
| 5,919,537 A | 7/1999 | Niazy |
| 5,968,657 A | 10/1999 | Scullin et al. |

GLOSS-ADJUSTING MASK LAYER WITH PARTICULATE FILLER

FIELD OF THE INVENTION

The present invention relates to sheet materials generally and more particularly relates to a sheet material suitable for use as a flexible, weatherable paint film.

BACKGROUND OF THE INVENTION

Manufacturers have shown increasing interest in using paint films in lieu of spray painting for providing a decorative surface finish for parts, such as automobile body parts. This manufacturing technique reduces the environmental concerns associated with painting and has the potential to reduce manufacturing costs. An automobile body part utilizing a plastic paint film to provide a high quality base coat/clear coat automotive finish is disclosed, for example, in U.S. Pat. No. 4,810,540, which is incorporated by reference herein in its entirety. In producing the part, the paint film is typically formed into a contoured three-dimensional configuration corresponding to the shape of the outer surface of the part by suitable methods, such as by thermoforming.

Automotive manufacturers, for example, require that automotive parts have an exterior paint appearance which meets demanding performance and appearance specifications, such as weatherability, resistance to ultraviolet light degradation, high gloss, and high distinctness-of-image (DOI). For some applications, a paint film having an exterior surface that exhibits a low gloss or matte finish is desirable.

Heretofore, it has been difficult to produce a paint film having a uniform low gloss appearance where the paint film is formed into a complex three-dimensional configuration. Typically, the forming process imparts significant elongation to some areas of the paint film while leaving other areas substantially non-elongated. The amount of elongation impacts the exterior gloss of the paint film in such a manner that uniform gloss is difficult to achieve.

In U.S. Pat. No. 5,750,234 to Johnson, et al, a paint film having low surface gloss is provided by dispersing a particulate filler in the outer clear coat layer of the film, in conjunction with use of a matte finish carrier layer. During thermoforming, the particulate filler in the clear coat layer lowers the surface gloss of the outer clear coat. However, the Johnson patent does not solve the problem of poor gloss uniformity in a complex three-dimensional paint film where substantial differences in the amount of elongation experienced by different areas of the film exist. Additionally, adding a filler material to the clear coat layer can adversely affect weatherability and durability properties of the clear coat layer, such as scratch and mar resistance.

There remains a need for an improved method of applying a paint film finish to complex-shaped molded articles, such as highly contoured automobile body parts, that meets or exceeds the demanding performance and appearance specifications of part manufacturers. Specifically, there is a need for a method of providing a uniformly low gloss paint film finish for complex-shaped, three-dimensional molded articles.

SUMMARY OF THE INVENTION

The present invention provides a uniform low gloss paint film, and a method for forming such a paint film, suitable for surfacing complex-shaped three-dimensional molded articles. Despite differences in the amount of elongation experienced by different areas of the paint film of the present invention, the paint film exhibits a controllable, low gloss finish that is substantially uniform in appearance, regardless of extent of elongation.

The present invention provides a flexible, weatherable decorative sheet material that includes a decorative paint film, wherein the paint film has an inner surface and a weatherable outer surface, and an extensible mask layer releasably adhered to the outer surface of the paint. film. The extensible mask layer forms a protective film overlying the paint film and comprises a film-forming polymer component and at least one particulate filler dispersed in the polymer component. The film forming polymer component is preferably selected from the group consisting of polyurethane, polyolefin, polyester, polyamide, and mixtures thereof The extensible mask layer has a thickness of about 0.3 mil to about 3 mils.

Preferably, the particulate filler is selected from the group consisting of pigments, fumed silica, talc, calcium carbonate, clay, alumina, and mixtures thereof. In an exemplary embodiment, the particulate filler is present in the mask layer at a concentration of at least about 0.5 weight percent of the mask layer on a dry solids basis. Other exemplary embodiments utilize a filler concentration of at least about 1.0 weight percent or at least about 2.0 weight percent. The particulate filler has a mean particle size of up to about 20 microns.

The particulate filler concentration is preferably sufficient to controllably alter the gloss appearance of the underlying paint film after thermoforming and upon removal of the mask layer. Typically, the weatherable outer surface of the paint film has a 60 degree gloss of at least about 60 in dry film form prior to adhering the paint film to the mask layer. After application of the mask layer and heat and/or pressure, the outer surface of the paint film has a 60 degree gloss of less than about 30 after removal of the mask layer. Preferably, the outer surface of the paint film has a 60 degree gloss of less than about 20 after removal of the mask layer.

The paint film may comprise a single layer of a pigmented polymer or multiple layers including a clear coat layer of a transparent weatherable polymer and an underlying color coat layer of a pigmented polymer. The paint film may further include a color adjustment layer between the clear coat layer and the color coat layer. The sheet material may include additional layers, such as a thermoformable backing layer bonded to the inner surface of the paint film, and an adhesive layer bonding the backing layer to the inner surface of the paint film.

The present invention also provides a preform for in-mold surfacing of a part comprising the sheet material described above formed into a three-dimensional configuration. The forming step may comprise, for example, thermoforming the sheet material. The present invention further includes a composite-shaped part comprising the preform described above and a substrate of a thermoplastic polymer conforming to the three-dimensional configuration of the preform and adhered thereto.

The present invention also provides a method of controlling the gloss appearance of a paint film. The method includes providing a decorative paint film having an inner surface and an outer surface having an initial gloss value. The initial 60 degree gloss value is preferably at least about 60. An extensible mask layer is releasably adhered to the outer surface of the paint film. The extensible mask layer comprises a film-forming polymer component and at least one particulate filler dispersed in the polymer component as described above. Heat and pressure are applied to the paint film and the adhered mask layer in order to cause the mask layer to alter the gloss value of the adjacent paint film. Thereafter, the mask layer is stripped from the paint film to expose the paint film with the altered gloss value. Preferably, the altered 60 degree gloss value is less than about 30 after the removal of the mask layer, and most preferably less than about 20. In one embodiment. the step of applying heat and pressure comprises forming, such as thermoforming, of the paint film and the adhered mask layer. The forming process causes certain areas of the paint film to undergo an elongation of up to about 300 percent while leaving other areas of the paint film substantially non-elongated. Despite the differences in elongation experienced by different areas of the paint film, after the removal of the mask layer, the 60 degree gloss rating of the elongated areas of the paint film is within 10 gloss units of the gloss rating of the non-elongated areas.

BRIEF DESCRIPTION OF THE DRAWINGS

Figure 1:
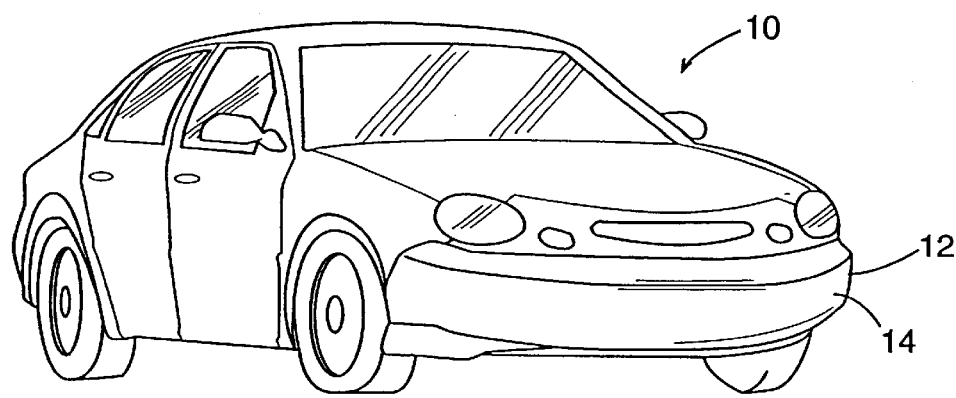
Figure 2:
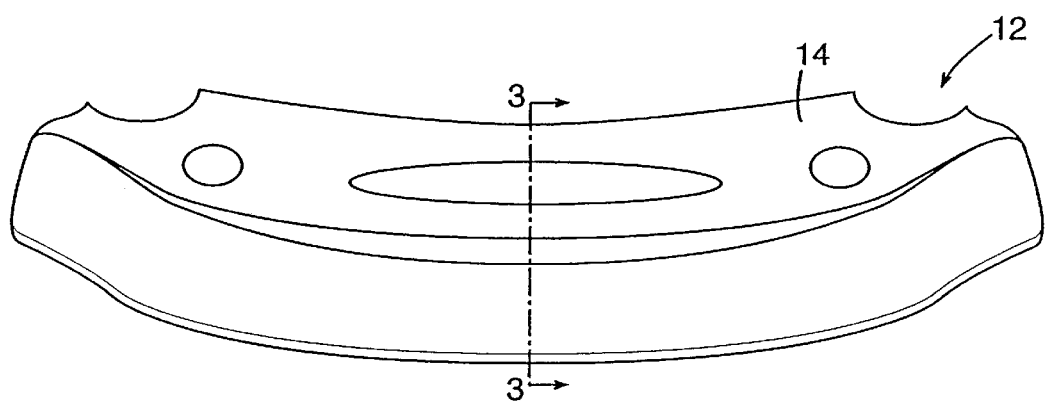
Figure 3:
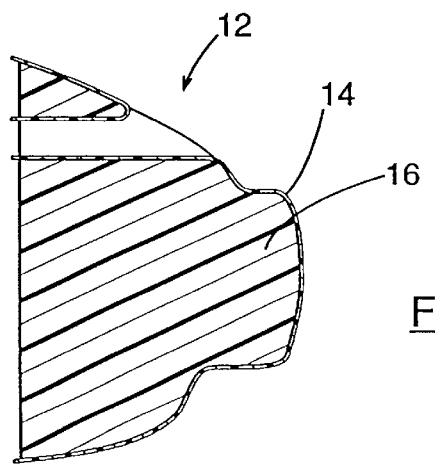
Figure 4:
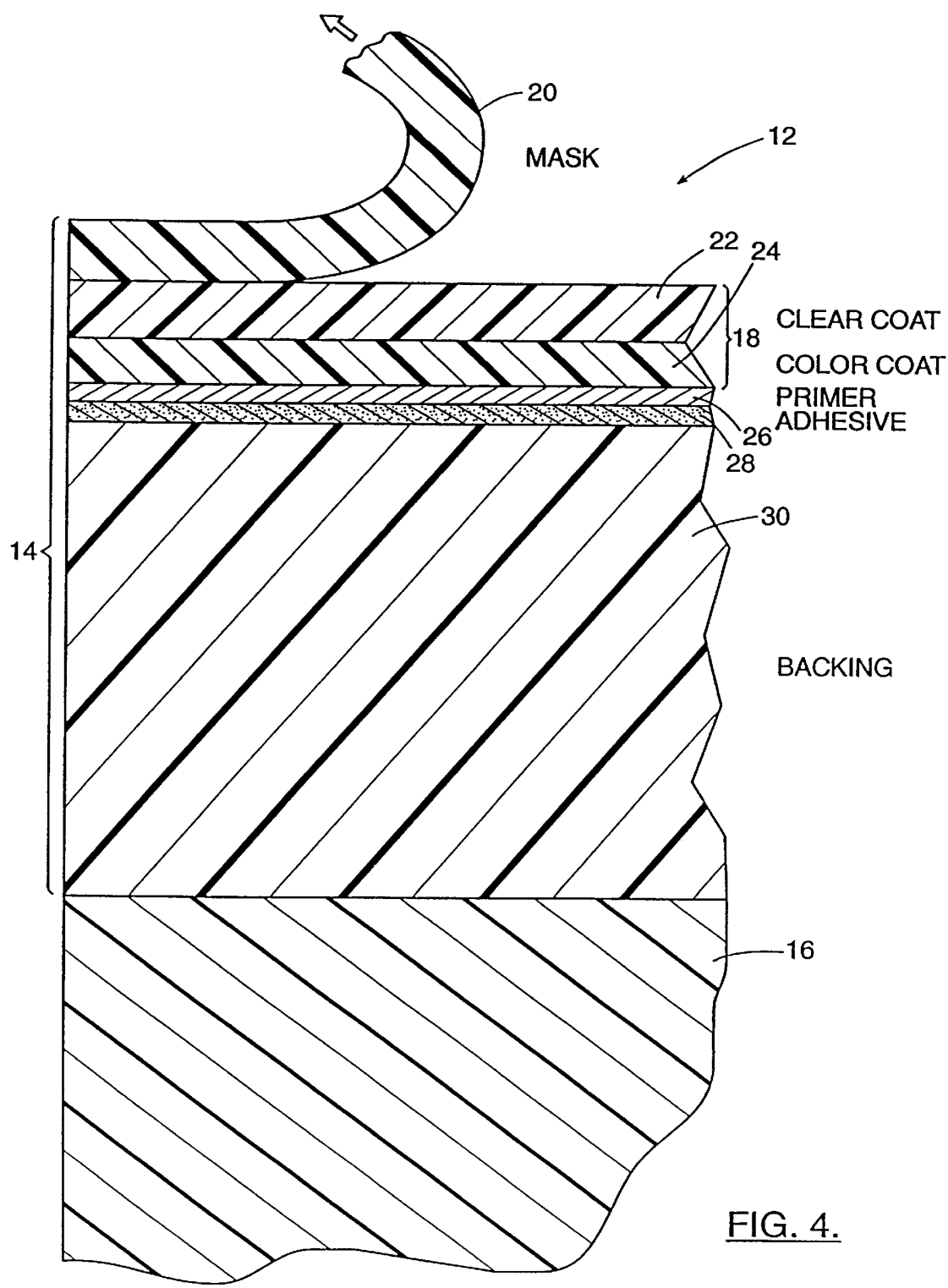
Figure 5:
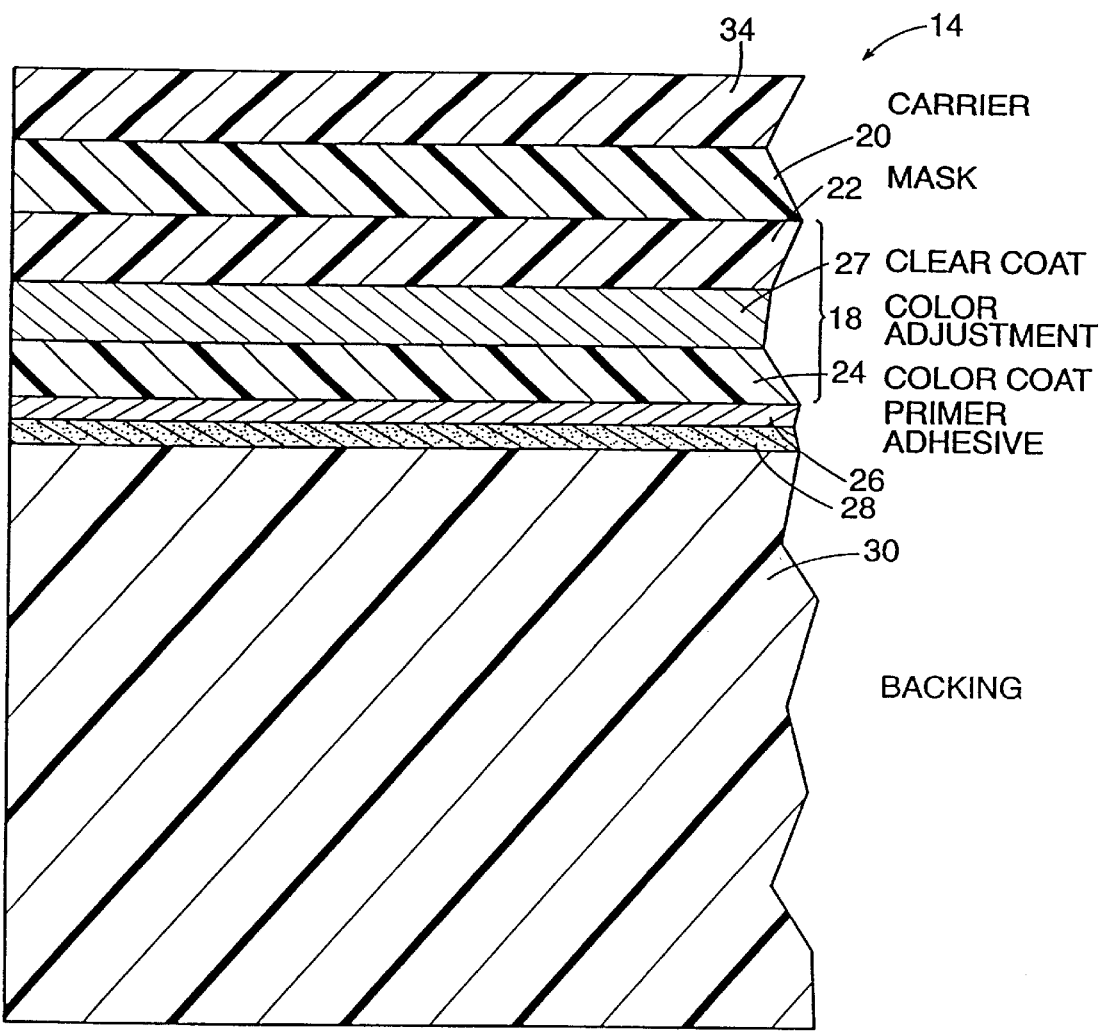
Figure 6:
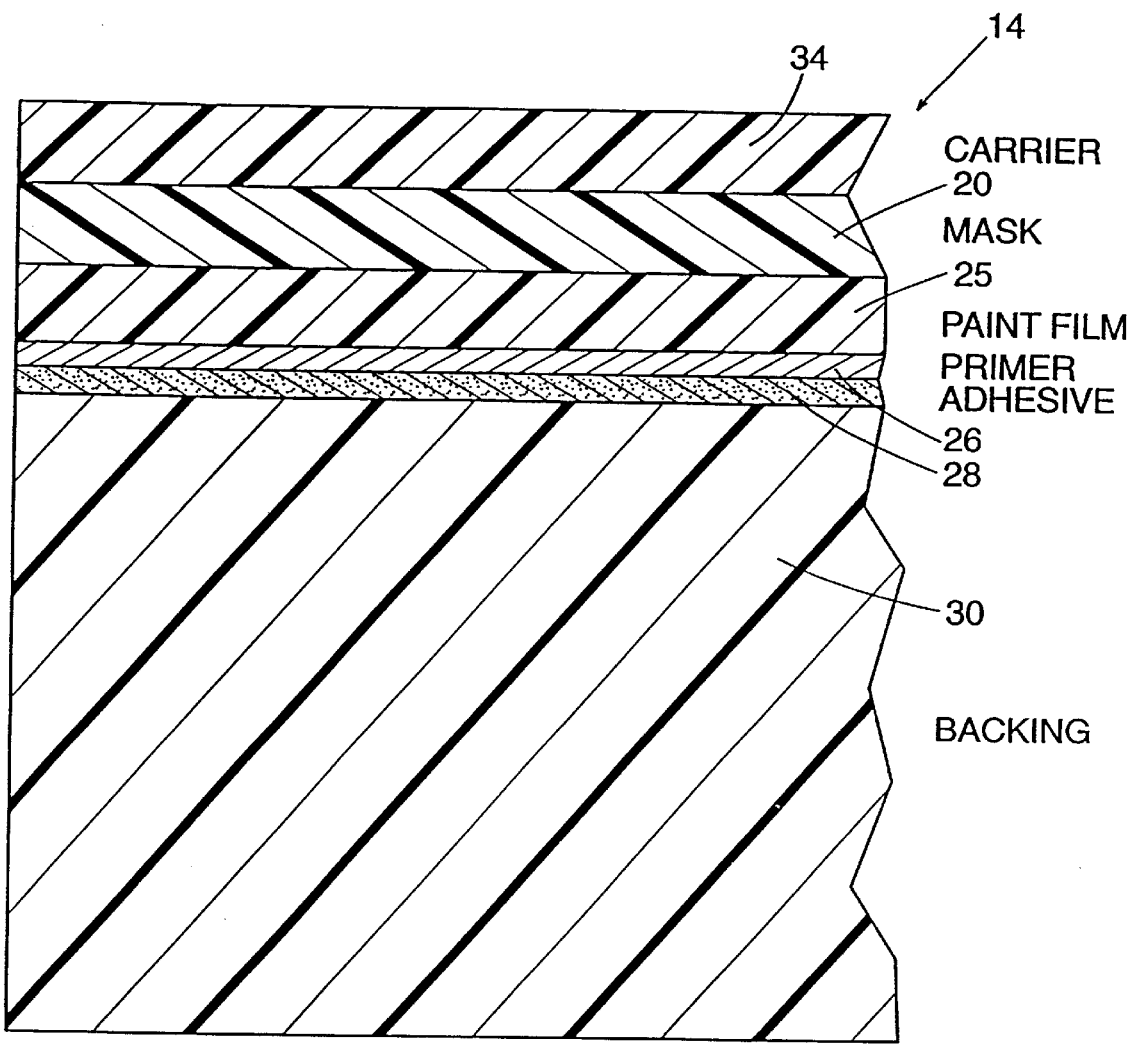
Figure 7:
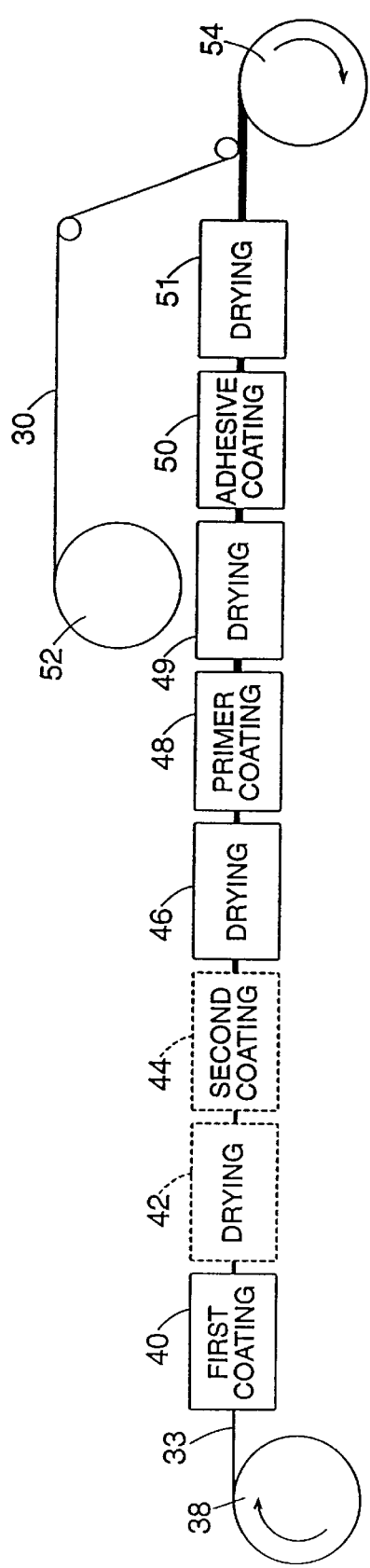
Figure 8:
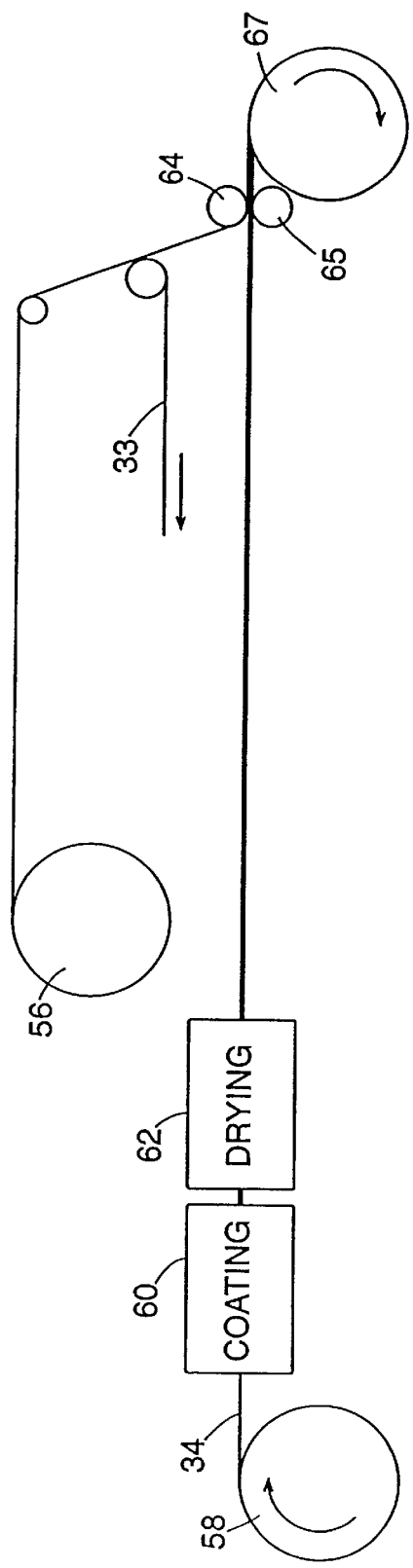
Figure 9A:
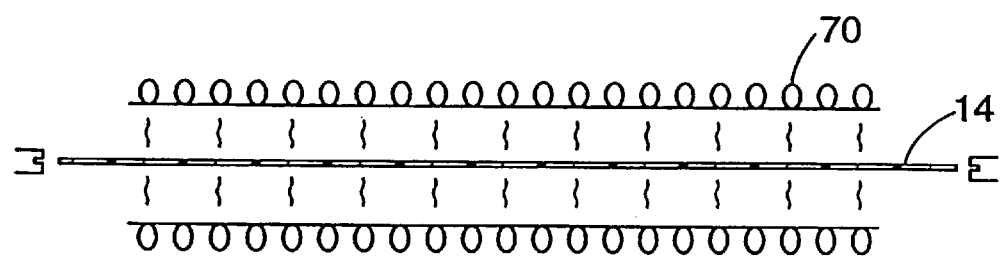
Figure 9B:
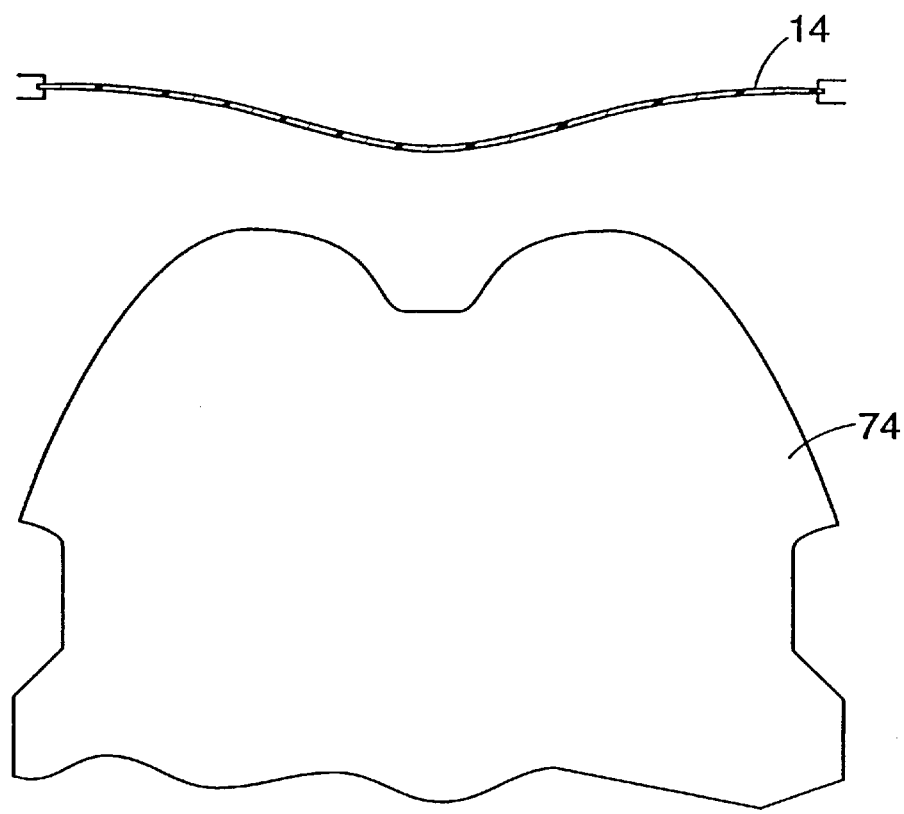
Figure 9C:
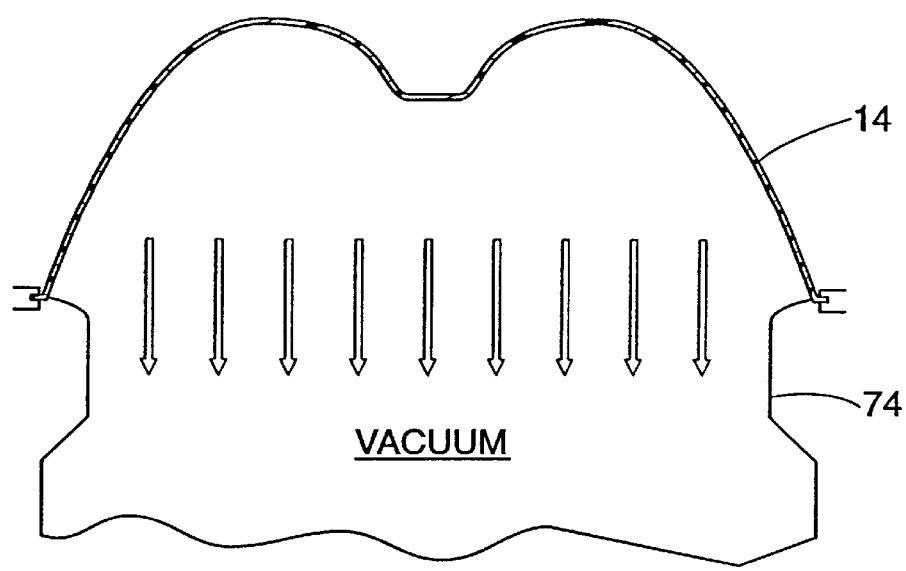
Figure 9D:
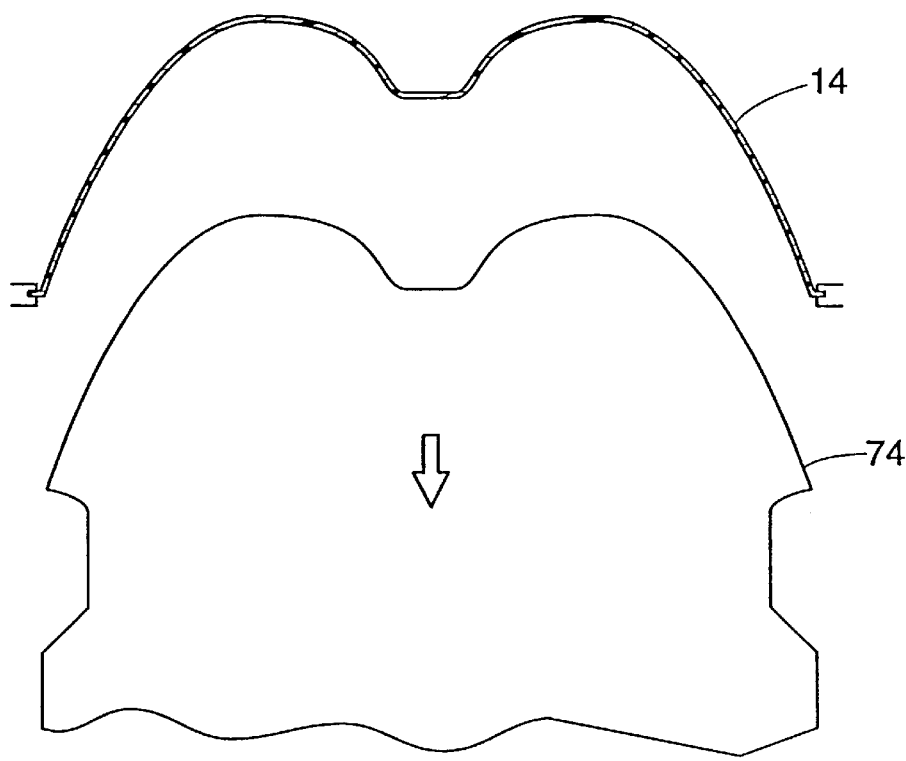
Figure 10A:
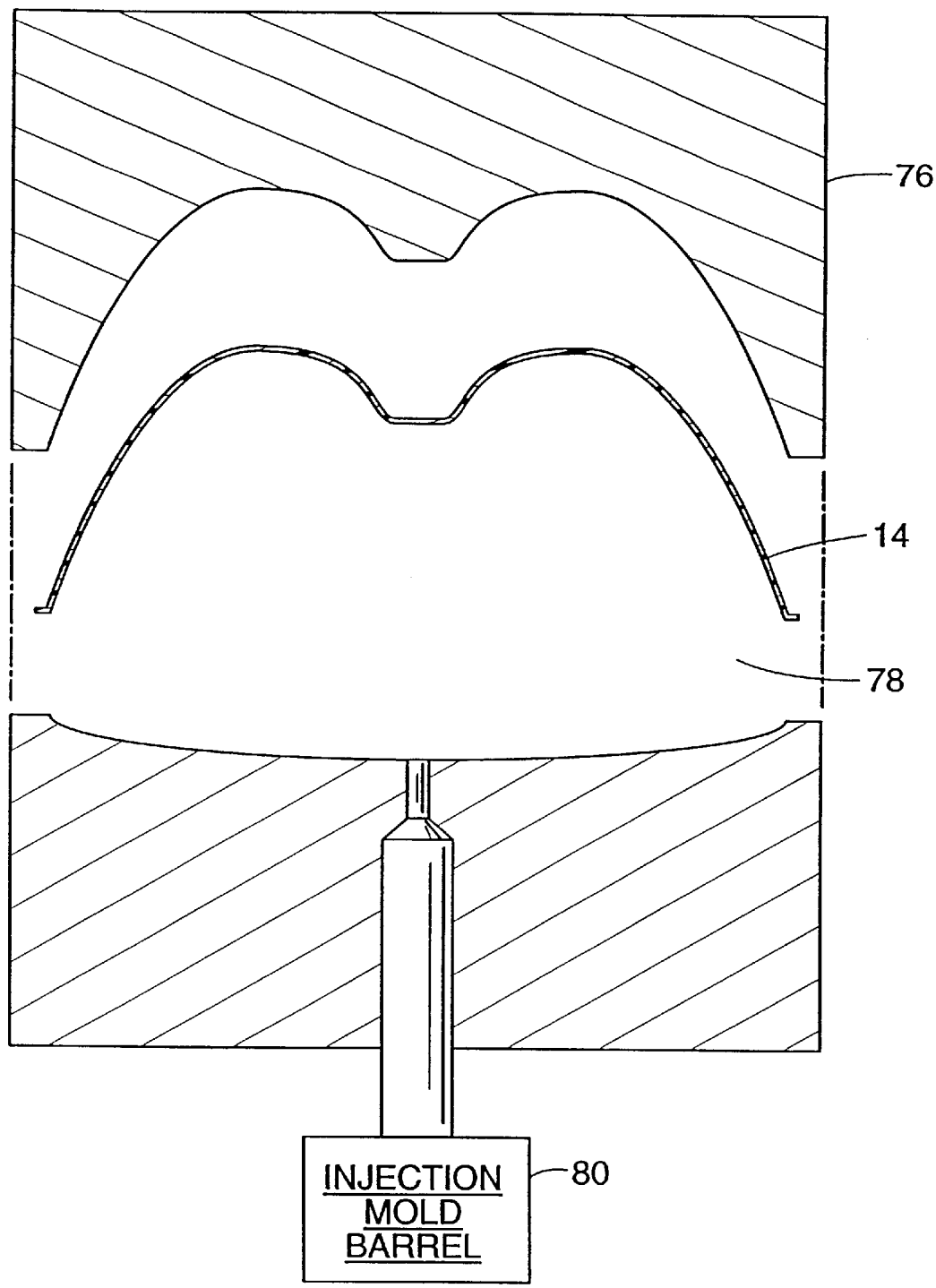
Figure 10B:
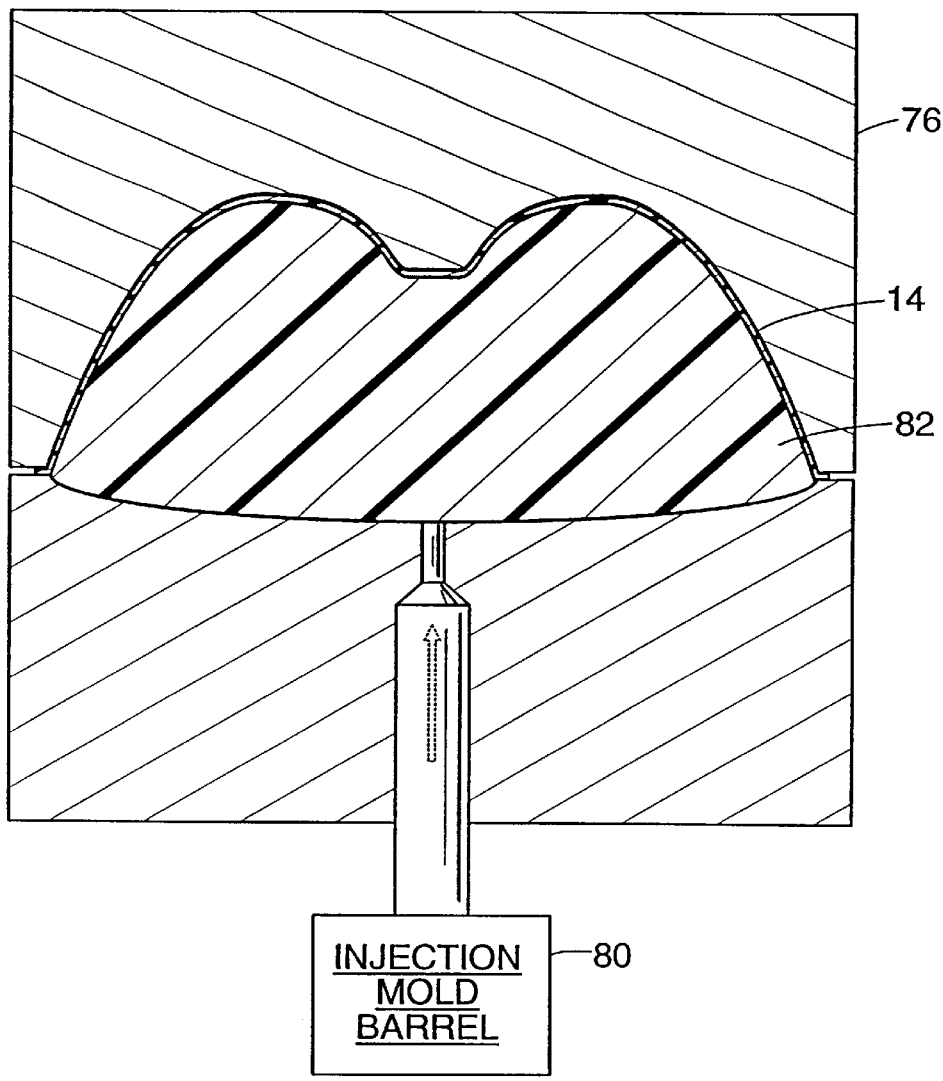
Figure 10C:
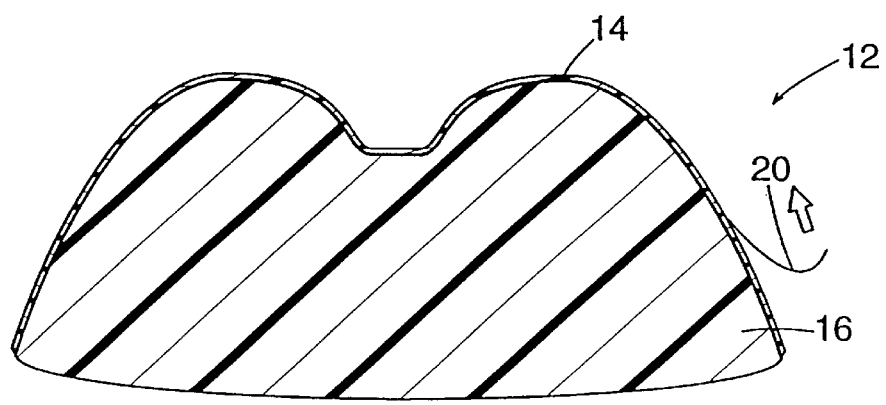

Having thus described the invention in general terms, reference will now be made to the accompanying drawings, which are not necessarily drawn to scale, and wherein:

FIG. 1 is a perspective view of an automobile illustrating the front fascia of the automobile having a decorative paint film applied thereto;

FIG. 2 is a front view of an automobile front fascia having a decorative paint film applied thereto;

FIG. 3 is a cross-sectional view of the fascia shown in FIG. 2 taken along line 3—3 of FIG. 2, FIG. 4 is a cross-sectional view of the decorative sheet material of the present invention adhered to a substrate;

FIG. 5 is a cross-sectional view of the decorative sheet material of the present invention including a clear coat and a color coat layer;

FIG. 6 is a cross-sectional view of the decorative sheet material of the present invention having a single paint film layer;

FIG. 7 is a schematic illustration of a process for construction of the decorative sheet material of the present invention, FIG. 8 is a schematic illustration of a process for applying the mask layer to the outer surface of a decorative paint film;

FIGS. 9A–9D are schematic illustrations of the steps in a thermoforming process used to construct a preform; and FIGS. 10A–10C are schematic illustrations of steps in an injection molding process for forming a composite shaped part.

DETAILED DESCRIPTION OF THE INVENTION

The present invention now will be described more fully hereinafter with reference to the accompanying drawings, in which preferred embodiments of the invention are shown. This invention may, however, be embodied in many different forms and should not be construed as limited to the embodiments set forth herein; rather, these embodiments are provided so that this disclosure will be thorough and complete, and will fully convey the scope of the invention to those skilled in the art. Like numbers refer to like elements throughout.

FIG. 1 illustrates an automobile 10 having a composite shaped part 12. As shown, the composite shaped part 12 is a complex, contoured three-dimensional front fascia of the automobile 10. The composite shaped part 12 has a decorative sheet material 14 applied thereto. Although not limited to such applications, the decorative sheet material 14 of the present invention is particularly advantageous for providing a decorative surface on a composite shaped part 12 of an automobile 10. However, those skilled in the art will appreciate that the present invention could be used in a variety of applications requiring a weatherable, decorative surface.

FIG. 2 is a front view of the composite shaped part 12 having the decorative sheet material 14 applied thereto. FIG. 3 is a cross-sectional side view of the composite shaped part 12 comprising a substrate 16 having a decorative sheet material 14 applied thereto. As illustrated in FIG. 3, the decorative sheet material 14 undergoes different amounts of elongation at different points along the contoured surface of the composite shaped part 12. In one embodiment, the decorative sheet material 14 of the present invention has a three-dimensional configuration in which certain areas of the sheet material have been subjected to elongation up to, and even in excess of, about 300%, and other areas of the sheet material are substantially non-elongated. However, the difference in gloss value between the elongated areas and the non-elongated areas should be no more than 10 gloss units. The decorative sheet material 14 of the present invention is capable of maintaining a uniform level of gloss regardless of the amount of elongation experienced by the decorative sheet material during a thermoforming or molding process.

FIG. 4 shows a greatly expanded cross-sectional view of a composite shaped part 12 comprising a decorative sheet material 14 of the present invention adhered to a substrate 16. The decorative sheet material includes a mask layer 20, a clear coat layer 22, a color coat layer 24, a primer layer 26, an adhesive layer 28, and a thermoformable backing layer 30.

The extensible mask layer 20 is designed to controllably alter gloss and DOI during forming processes and molding processes. Forming processes include, but are not limited to, thermoforming, cold stretching, and vacuum forming. Molding processes include, but are not limited to, injection molding, compression molding, and blow molding. The mask layer 20 also adds strength to the decorative sheet material 14 and improves process uniformity during the thermoforming process. Additionally, the extensible mask layer 20 protects the underlying layers of the decorative sheet material 14 from scratching or marring until the part is ready for display. The mask layer 20 is capable of stretching up to about 600 percent during thermoforming and has a room temperature elongation at break of at least about 200 percent.

The mask layer 20 may be retained as the outer layer of the decorative sheet material 14 during construction of the final product, such as an automobile. Thereafter, the mask layer 20 may be removed to reveal the underlying decorative paint film 18. For instance, the extensible mask layer 20 can be maintained as a protective layer and removed only after the vehicle has completed shipment and is ready for delivery to a customer. The extensible mask layer 20 is releasably bonded to the underlying decorative paint film 18 and may be stripped away from the underlying layers in a single piece.

Additionally, the extensible mask layer 20 maintains uniform gloss and DOI during injection or compression molding, such as thermoplastic or thermoset compression molding, where the mold is roughened or deglossed. Roughened molds are less expensive than highly polished molds and are also functionally superior to highly polished molds because the rough mold surface enhances air removal from the mold as the mold closes. The extensible mask layer 20 protects the paint film 18 from damage caused by the mold without resorting to the use of highly polished molds.

Preferably, the extensible mask layer 20 is about 0.3 mils to about 3.0 mils in thickness. The extensible mask layer 20 includes a film-forming polymer component. Preferably, the film-forming component is selected from the group consisting of polyurethane, polyolefin, polyester, polyamide, and mixtures thereof In one embodiment, the film-forming polymer component comprises an aliphatic or aromatic polyester or polyether polyurethane in the form of a dispersion or a solution. For example, polyurethane polymers QA 5218 and QA 5026, manufactured by Mace Adhesives and Coatings of Dudley, Mass., may be used to form the mask layer 20. In one embodiment, the mask layer 20 comprises about 85 to about 99.5 weight percent polyurethane water-borne dispersion. Advantageously, a small amount of surfactant (about 0.05 to about 0.2 weight percent), such as SURFYNOL 104 H manufactured by Air Products of Allentown, Pa. is added to lower surface tension.

The mask layer 20 further comprises a particulate filler dispersed in the film-forming polymer component. The size and concentration of the particulate filler determine the gloss and texture appearance of the underlying paint film. The particulate filler is preferably selected from the group consisting of fumed silica, talc, calcium carbonate, clay, alumina, and mixtures thereof However, other particulate fillers, such as pigments, that are compatible with the film-forming polymer component may be used without departing from the present invention. Advantageously, the particulate filler is chemically inert. In a preferred embodiment, the particulate filler has a mean particle size up to about 20 microns. For example, the particulate filler may have a mean particle size of about 2 to about 20 microns. In one embodiment, the mean particle size is about 5 microns.

Advantageously, the particulate filler dispersed in the polymer component is present at a concentration sufficient to controllably alter the gloss appearance of the underlying paint film after forming and upon removal of the mask layer. The concentration of the particulate filler will depend largely on the desired gloss of the final product. Different levels of particulate filler may be utilized in order to produce different levels of gloss reduction in the final product. A greater concentration of particulate filler in the mask layer 20 will generally provide a lower final gloss value in the resulting paint film 18. For example, if only relatively slight reduction in gloss is desired, the particulate filler may be present in the mask layer at a concentration of about 0.5 weight percent of the mask layer on a dry solids basis. Similarly, if greater reductions in gloss are desired, concentrations of particulate filler of least about 1.0 weight percent or at least about 2.0 weight percent may be used.

Generally, the weatherable outer surface of the paint film 18 has an initial 60 degree gloss of at least about 60 in dry film form prior to adhering the paint film to the mask layer 20. After adhering the mask layer 20 to the paint film 18 and forming the resulting film material into a three-dimensional configuration, the outer surface of the paint film has a 60 degree gloss of less than about 30, and preferably less than about 20, after removal of the mask layer. However, the desired final gloss value of the paint film 18 will vary depending on the application.

The mask layer 20 composition may include additional additives designed to migrate into the clear coat layer 22 to enhance weatherability or other desirable properties of the clear coat layer or to prevent migration of additives from the clear coat into the mask layer. Migratory additives suitable for use with the present invention include, but are not limited to, hardness enhancers, release agents, ultraviolet light stabilizers, antioxidants, dyes, lubricants, surfactants, catalysts, and slip additives.

More specifically, the migratory additives useful in the present invention include benzophenone, silicones, waxes, triazoles, triazines and combinations thereof. The migratory additives are encouraged to migrate into the outer surface of the clear coat layer 22 by the heat and/or pressure present during thermoforming or molding processes. Additionally, the presence of these additives in the mask layer 20 prevents migration of additive components from the clear coat layer 22 into the mask layer.

Ultraviolet light stabilizers, such as TINUVIN 1130 and TINUVIN 292, both manufactured by Ciba Geigy of Hawthorne, N.Y., can be added as migratory additives in the mask layer 20 composition. Silicone additives, such as BYK 333 manufactured by BYK Chemie of Wallingford, Conn., can be added to lower the coefficient of friction of the clear coat layer 22. The migratory additives are generally added in amounts ranging from about 0.01 to about 2.0 weight percent, with all additives accounting for no more than about 5.0 weight percent of the mask layer 20 composition.

FIGS. 5 and 6 are greatly expanded cross-sectional views of two embodiments of the decorative sheet material 14 of the present invention. The decorative paint film 18 may comprise a single layer 25 of a pigmented polymer, as shown in FIG. 6, or may comprise multiple layers, as shown in FIGS. 4 and 5. If a single layer 25 of pigmented polymer is used, the polymer may be selected from the group consisting of urethane polymers, acrylic polymers, fluoropolymers, and alloys of a fluoropolymer and an acrylic polymer. FLUOREX® films manufactured by Rexam are examples of alloys of a fluoropolymer and an acrylic polymer. The single layer 25 of pigmented polymer may also include UV screeners to enhance weatherability, antioxidants, heat stabilizers, and other conventional additives. The pigmented polymer layer 25 may further include pigments, dyes, and/or flakes to enhance visual appearance.

As shown in FIGS. 4 and 5, the decorative paint film 18 may also comprise both a clear coat layer 22 and a color coat layer 24. The clear coat layer 22 is formed from a substantially transparent weatherable polymer composition selected to provide a film which will not significantly fade, peel, crack, or chalk when exposed to the environment for the intended life of the part 12. Additionally, the clear coat layer 22 must be formable from a two-dimensional surface to a three-dimensional surface without objectionable loss of appearance or performance properties. Advantageously, the clear coat layer 22 is selected from the group consisting of urethane polymers, acrylic polymers, fluoropolymers, and alloys of a fluoropolymer and an acrylic polymer (such as FLUOREX® films). As with the single pigmented polymer layer 25, the clear coat layer 22 may include UV screeners, antioxidants, heat stabilizers, and other conventional additives. Preferably, the clearcoat layer 22 is about 0.3 to about 3 mils in thickness.

In one embodiment, the outermost layer of the paint film 18, such as the pigmented polymer layer 25 or the clear coat layer 22, comprises an alloy of a fluoropolymer and an acrylic polymer, wherein the acrylic polymer comprises a polymethyl methacrylate having an inherent viscosity of at least about 15,000 cps. For example, the alloy of fluoropolymer and acrylic polymer may comprise about 50 to about 70 weight percent fluoropolymer, and about 30 to about 50 weight percent acrylic polymer on a dry solids basis. A commercially available fluoropolymer is KYNAR 441 F manufactured by Elf Atochem. A commercially available acrylic polymer is Elvacite 2041 manufactured by ICI.

The color coat layer 24 is formed of a polymer composition containing a uniformly dispersed pigment to provide the appearance necessary for exterior automobile use. Preferably, the color coat layer 24 is selected from the group consisting of urethane polymers, acrylic polymers, fluoropolymers, and alloys of a fluoropolymer and acrylic polymer (such as FLUOREX® films). The color coat layer 24 may include pigments, dyes, and/or flakes to enhance visual appearance and improve weatherability. Preferably, the color coat layer 24 is about 0.3 to about 3 mils in thickness.

If desired, a color adjustment layer 27 may be added between the clear coat layer 22 and the color coat layer 24 to enhance visual appearance. The color adjustment layer 27 can be applied in coating form and include pigments, dyes and/or flakes or applied as a graphic design using printing methods such as gravure, rotary screen, flat bed step-and-repeat screen, ink jet, flexographic or other printing techniques.

The primer layer 26 is an optional layer that improves adhesion between the color coat layer 24 and the adhesive layer 28. The primer layer 26 preferably comprises an acrylic polymer prepared in solution using any compatible solvent known in the art, such as toluene. In one embodiment, the primer layer 26 is prepared from a solution comprising about 65 to about 85 weight percent acrylic composition and about 5 to about 10 weight percent solvent. An acrylic polymer suitable for use in the primer layer 26 is acrylic adhesive 68070 manufactured by DuPont. The primer layer 26 may be opaque, colored or clear. Opaque is defined as less than 1 percent transmission at a wavelength of less than 400 nm. The primer layer 26 is preferably about 0.2 to about 2 mils in thickness. The primer layer 26 may be colored or opaque to protect the underlying thermoformable backing layer 30 from damage caused by UV exposure. Pigments, such as carbon black, titanium oxide, and mixtures thereof, may be added to impart color to the acrylic polymer composition used in the primer layer 26. Additionally, additives such as UV screeners, antioxidants, and heat stabilizers may be added to the primer layer 26.

The adhesive layer 28 adheres the decorative paint film 18 to a thermoformable backing layer 30. The adhesive layer 28 comprises one or more layers selected from the group consisting of urethane adhesives, acrylic adhesives, acrylic adhesives with cross linkers, chlorinated polyolefins and mixtures thereof Preferably, a mixture of a chlorinated polypropylene and a higher molecular weight chlorinated polyolefin is used. In one embodiment, the adhesive layer 28 is prepared from a mixture of about 5 to about 20 weight percent chlorinated polypropylene and about 1 to about 10 weight percent of a higher molecular weight chlorinated polyolefin formed in solution. A compatible solvent known in the art, such as toluene, is present in an amount of about 60 to about 80 weight percent. A chlorinated polypropylene suitable for use with the present invention is HARDLEN 13 LP manufactured by Advanced Polymer. A higher molecular weight chlorinated polyolefin suitable for use with the present invention is SUPERCHLON 822S manufactured by CP/Phibrochem of Fort Lee, N.J. The adhesive layer 28 should be capable of stretching about 20 to about 600 percent. Due to the substantial elongation capability of the adhesive layer 28, the adhesive layer maintains the necessary adhesive strength to prevent delamination of the decorative paint film 18 from the thermoformable backing layer 30 over a wide temperature range.

An epoxy component, such as EPON 828RS manufactured by Shell Chemical, may be added in small amounts (approximately about 0.1 to about 2.0 weight percent on a dry solids basis) as an acid scavenger. As with the primer layer 26, the adhesive layer 28 may be colored or opaque to protect the underlying thermoformable backing layer 30 from damage caused by UV exposure. Pigments, such as carbon black, titanium oxide, and mixtures thereof, may be added to impart color to the polymer composition used in the adhesive layer 28. Additives such as UV screeners, antioxidants, and heat stabilizers may be added to the adhesive layer 28. Preferably, the adhesive layer 28 is about 0.2 to about 2 mils in thickness.

The thermoformable backing layer. 30 bonds the decorative paint film 18 of the decorative sheet material 14 to the substrate 16. In addition, the backing layer 30 provides bulk and/or rigidity for handling the decorative sheet material 14 as a thermoformed preform. The backing layer 30 also provides thickness to prevent glass fibers, fillers or other sources of visual roughening or "orange peel" from the substrate 16 from affecting the visual appearance of the decorative sheet material 14. The backing layer 30 must bond well with both the substrate 16 and the adhesive layer 28. The backing layer 30 may be selected from the group consisting of thermoplastic olefin, acrylonitrile-butadiene-styrene terpolymer, polypropylene, thermoplastic polyimide, polyethylene oxide, polycarbonate, polyvinyl chloride, polystyrene, styrene/polyphenylene oxide (NORYEL), polybutylene terephthalate, nylon, PETG copolyester, and mixtures, laminates and copolymers thereof, depending on the material used as the substrate 16.

FIG. 7 illustrates a process for constructing the decorative sheet material 14 of the present invention. As shown, a film carrier 33 is advanced from a supply roll 38 through a series of process steps. The film carrier 33 preferably comprises a polyester casting film having a high gloss surface. The film carrier 33 is important for high gloss applications because it imparts high gloss and DOI to the decorative sheet material 14. Advantageously, the film carrier 33 comprises polyethylene terephthalate (PET) in a grade without slip additives. The film carrier 33 is about 1 to about 3 mils in thickness, preferably about 2 mils in thickness.

The film carrier 33 passes through a first coating station 40. If a single pigmented layer 25 is used as the decorative paint film 18, the pigmented layer is deposited onto the film carrier 33 using coating station 40 and the resulting film is dried by dryer 46. If a decorative paint film 18 having multiple coatings is desired, the first coating station 40 may deposit the clear coat layer 22. The clear coat layer 22 then passes through a dryer 42. Thereafter, a color coat layer 24 is deposited on the dried clear coat layer 22 using coating station 44. The color coat layer 24 is then dried using dryer 46. Optionally, the dried color coat layer 24 can be subjected to a corona treatment (not shown).

The coating stations 40 and 44 may utilize any conventional coating or casting techniques, such as reverse roll coating or slot die coating techniques. Slot die coating methods are preferred.

The dryers 42 and 46 may utilize any conventional drying technique. Preferably the dryers 42 and 46 are ovens having multiple heating zones wherein each successive heating zone operates at a progressively higher temperature. For example, an oven having four to six heating zones ranging in temperature from about 200° F. to about 425° F. may be used. Alternatively, dryer 42 may be eliminated from the process such that the color coat 24 is applied to the clear coat 22 while the clear coat is still wet using a "wet on wet" coating technique.

After the decorative paint film 18 is applied to the film carrier 33, the film carrier advances to a primer coating station 48, where the primer layer 26 is deposited onto the exposed layer of the decorative paint film 18. The primer layer 26 is then dried using dryer 49. Thereafter, the film carrier advances to an adhesive coating station 50, where the adhesive layer 28 is deposited onto the primer layer 26. Thereafter, the adhesive layer 28 is dried using dryer 51. The primer coating station 48 and adhesive coating station 50 may utilize any conventional coating or casting technique, such as reverse roll coating or slot die coating techniques. The dryers 49 and 51 may utilize any conventional drying technique. Alternatively, dryer 49 may be eliminated from the process such that the adhesive layer 28 is applied to the primer layer 26 while the primer layer is still wet using a "wet on wet" coating technique.

A thermoformable backing layer 30 is advanced from a supply roll 52 and laminated to the adhesive-coated surface of the film carrier 33. Optionally, the backing layer 30 can be subjected to a corona treatment (not shown) prior to lamination. The resulting laminate is collected by product roll 54.

FIG. 8 illustrates a process for preparing a decorative sheet material 14 having a mask layer 20. A non-extensible carrier 34 is advanced from a supply roll 58. The carrier 34 may be constructed of the same material used for the film carrier 33. Preferably, the carrier 34 comprises a polyethylene terephthalate film. The carrier 34 advances through a coating station 60, where the mask layer 20 is deposited onto a surface of the carrier. The coating station 60 may utilize any coating or casting technique known in the art, such as reverse roll coating or slot die coating techniques. Thereafter, the coated carrier 34 passes through a dryer 62 to form a dried mask layer 20. As discussed above in connection with dryers. 42 and 46 used to dry the decorative paint film 18, the dryer 62 used to dry the mask layer 20 may utilize any conventional drying technique. Preferably, the dryer 62 comprises. an oven with multiple heating stages. The dryer 62 evaporates the solvents present in the mask layer 20 composition.

The layers of the decorative sheet material 14 formed in the process illustrated in FIG. 7 are advanced from a supply roll 56. The film carrier 33 is stripped away from the remaining layers to expose either the single pigmented layer 25 or the clear coat layer 22 of the decorative paint film 18, depending on the construction of the paint film used. The exposed outer layer of the decorative paint film 18 is laminated and releasably bonded to the mask layer 20 by nipping the two films between two rollers, 64 and 65, with or without applying heat to the layers. The resulting decorative sheet material 14 is collected by product roll 67. The non-extensible carrier 34 may be stripped away to expose the mask layer 20 before or after collection of the sheet material 14 by product roll 67.

In another embodiment, a single or multiple layer decorative paint film 18, primer layer 26, and adhesive layer 28 are coated directly onto the dried mask layer 20 rather than laminating the coated films together. The resulting multilayer film is laminated to a backing layer 30 as described above. In a further embodiment, the mask layer is coated onto the clear coat layer 22. For example, a decorative sheet material 14 prepared according to FIG. 7 could be stripped from carrier 33 so that the mask layer 20 can be coated directly onto the clear coat layer 22.

The decorative sheet material 14 of the present invention can be adhered to a supporting substrate 16 in accordance with known laminating or bonding techniques. Illustrative examples of supporting substrates 16 include metal, wood, and molded polymer substrates. As explained above, exterior automobile parts are particularly suitable as the substrate 16. Suitable polymers for use as the substrate 16 include, for example, thermoplastic olefin, acrylonitrile-butadiene-styrene terpolymer, polypropylene, thermoplastic polyimide, polyethylene oxide, polycarbonate, polyvinyl chloride, polystyrene, styrene/polyphenylene oxide (NORYEL), polybutylene terephthalate, nylon, PETG copolyester, Sheet Molding Compounds (SMC), RIM urethanes, and mixtures, laminates and copolymers thereof The decorative sheet material 14 may be applied to the substrate 16 by a variety of methods. These methods include, but are not limited to, compression molding, such as thermoplastic or thermoset compression molding, injection molding and the like. In an injection molding process, the decorative sheet material 14 may be preformed as described below or placed in the mold as a substantially flat sheet. If the sheet material 14 is placed in the mold without preforming, the heat and/or pressure of the molding process conforms the sheet material to the desired shape.

FIGS. 9A–9D illustrate the steps in a thermoforming process. Thermoforming is often used to create a preform in a three-dimensional configuration that roughly approximates the three-dimensional configuration of the final product. However, other forming processes known in the art may be used. The preform is then placed in a mold for in-mold surfacing of a desired substrate 16 to form the final product. FIG. 9A shows heating of the decorative sheet material 14 of the present invention by heating elements 70. The heating step softens and increases the extensibility of the decorative sheet material 14 so that the sheet material will readily conform to the contoured outer surface of the mold 74. As shown in FIG. 9C, the mold 74 is brought into contact with the heated decorative sheet material 14 and a vacuum is drawn to encourage conformity of the sheet material 14 to the contours of the mold 74. Thereafter, the mold 74 is removed from the decorative sheet material 14 and the sheet material is allowed to cool and harden into the three-dimensional configuration.

The forming process, such as the thermoforming process described above, is one method of controlling the gloss appearance of the paint films of the present invention. In the forming process, heat and/or pressure are applied to the paint film 18 and the adhered mask layer 20 to cause the mask layer to alter the gloss value of the adjacent paint film. For example, in the thermoforming process described above, both heat and pressure are applied to the paint film 18 and mask layer 20 as the paint film is formed into a three-dimensional configuration. The presence of a particulate filler in the mask layer 20, in combination with the heat and pressure applied to the sheet material, serves to alter the gloss value of the paint film 18. Thereafter, when the mask layer 20 is stripped from the paint film 18, the exposed paint film has an altered gloss value.

Despite the fact that the forming process applies differing amounts of elongation to different areas of the paint film, the final product exhibits a uniform, low gloss or matte finish. Certain areas of the paint film generally undergo an elongation of up to, or greater than, about 300 percent during the forming process, while other areas of the paint film remain substantially non-elongated. Regardless, after removal of the mask layer 20, the 60 degree gloss rating of the elongated areas of the paint film 18 are within 10 gloss units of the gloss rating of the non-elongated areas.

FIGS. 10A–10C illustrate steps in an in-mold surfacing process. As shown in FIG. 10A, the thermoformed decorative sheet material 14 is placed in the mold cavity 78 of an injection mold 76. The decorative sheet material is placed in the mold cavity 78 with the mask layer 20 facing the inner surface of the injection mold 76. Alternatively, the decorative sheet material 14 may be placed in the mold cavity 78 as a flat, two-dimensional insert rather than as a preform. As noted above, the mold 76 may have a roughened inner surface. The injection mold 76 is shut and a moldable polymer 82 is introduced into the mold 76 through the injection mold barrel 80. The polymer 82 bonds to the backing layer 30 and conforms to the contoured shape of the mold cavity 78. Thereafter, the moldable polymer 82 is allowed to cool and harden into a composite shaped part 12 comprising a substrate 16 bonded to a decorative sheet material 14, as shown in FIG. 10C. The mask layer 20 of the decorative sheet material may be stripped from the composite shaped part 12 to expose the paint film finish when desired.

EXAMPLE 1

Two formulations, Formula 1 and Formula 2, of a mask layer were prepared. The two formulations are listed below in Table 1 and Table 2.

TABLE 1

Formula 1

| Component | Parts by weight |
|---|---|
| QA 5218 | 99.037 |
| TINUVIN 1130 | .525 |
| TINUVIN 292 | .175 |
| BYK333 | .175 |
| SURFYNOL 104H | .088 |
| T. S. 100 | 1.5 |

TABLE 2

Formula 2

| Component | Parts by weight |
|---|---|
| QA 5218 | 99.037 |
| TINUVIN 1130 | .525 |
| TINUVIN 292 | .175 |
| BYK333 | .175 |
| SURFYNOL 104H | .088 |

Formula 1 contains a particulate filler material in the form of TS 100, an amorphous fumed silicon dioxide made by Degussa AG of Ridgefield, N.J. Formula 2 does not contain a particulate filler component. The two formulations were mixed in varying proportions to produce five mask layer formulations having five different concentrations of particulate filler. The amount of particulate filler for each sample is listed below in Table 3.

TABLE 3

| Sample # | Particulate Filler Content (weight percent by solids) |
|---|---|
| 1 | 0.0 |
| 2 | 1.0 |
| 3 | 2.0 |
| 4 | 3.0 |
| 5 | 4.0 |

Each mask layer sample was drawn down on a PET carrier layer at a thickness of about 1.2 mil. The mask layer samples were dried for three minutes at 176° F. and 3 minutes at 320° F. Thereafter, the mask layer samples were hot-nipped to a laminate of black FLUOREX® film on TPO and the PET carrier layer was stripped away. Initial gloss readings were taken for each sample. The five samples were then thermoformed onto a truncated pyramid-shaped mold. The mask layer was removed and final gloss readings were taken. The results are listed in Table 4 below. As shown, the level of gloss reduction increased with increasing amounts of particulate filler in the mask layer formation.

TABLE 4

| Sample # | Initial Gloss Reading (60°) | Final Gloss Reading (60°) |
|---|---|---|
| 1 | 66.9 | 53.5 |
| 2 | 68.2 | 31.7 |
| 3 | 67.5 | 23.7 |
| 4 | 67.1 | 17.8 |
| 5 | 67.2 | 17.1 |

Many modifications and other embodiments of the invention will come to mind to one skilled in the art to which this invention pertains having the benefit of the teachings presented in the foregoing descriptions and the associated drawings. Therefore, it is to be understood that the invention is not to be limited to the specific embodiments disclosed and that modifications and other embodiments are intended to be included within the scope of the appended claims. Although specific terms are employed herein, they are used in a generic and descriptive sense only and not for purposes of limitation.

That which is claimed:

1. A flexible, weatherable decorative sheet material useful in lieu of painting for providing a decorative finish for parts, comprising:

a decorative paint film, said paint film having an inner surface and a weatherable outer surface suitable for forming an exterior finish for a part, and an extensible mask layer releasably adhered to said outer surface of said paint film to form a protective film overlying said paint film, said mask layer comprising a film-forming polymer component and at least one particulate filler dispersed in said polymer component.

2. A sheet material according to claim 1, wherein said particulate filler is selected from the group consisting of pigments, fumed silica, talc, calcium carbonate, clay, alumina, and mixtures thereof.

3. A sheet material according to claim 1, wherein said particulate filler is present in said mask layer at a concentration of at least about 0.5 weight percent of said mask layer on a dry solids basis.

4. A sheet material according to claim 3, wherein said particulate filler is present in at a concentration of at least about 1.0 weight percent.

5. A sheet material according to claim 4, wherein said particulate filler is present at a concentration of at least about 2.0 weight percent.

6. A sheet material according to claim 1, wherein said particulate filler has a mean particle size of up to about 20 microns.

7. A flexible, weatherable decorative sheet material useful in lieu of painting for providing a decorative finish for parts, comprising:
- a decorative paint film, said paint film having an inner surface and a weatherable outer surface suitable for forming an exterior finish for a part,
- an extensible mask layer releasably adhered to said outer surface of said paint film to form a protective film overlying said paint film, said mask layer comprising a film-forming polymer component and at least one particulate filler dispersed in said polymer component and present at a concentration sufficient to controllably alter the gloss appearance of the underlying paint film after thermoforming and upon removal of the mask layer; and
- a non-extensible carrier layer releasably adhered to said extensible mask layer.

8. A sheet material according to claim 7, wherein said particulate filler is present in said mask layer at a concentration of at least about 0.5 weight percent of said mask layer on a dry solids basis.

9. A sheet material according to claim 8, wherein said particulate filler is present in at a concentration of at least about 1.0 weight percent.

10. A sheet material according to claim 9, wherein said particulate filler is present at a concentration of at least about 2.0 weight percent.

11. A sheet material according to claim 7, wherein said weatherable outer surface of said paint film has a 60 degree gloss of at least about 60 in dry film form prior to adhering said paint film to said mask layer.

12. A sheet material according to claim 7, wherein said film-forming polymer component is selected from the group consisting of polyurethane, polyolefin, polyester, polyamide, and mixtures thereof.

13. A sheet material according to claim 7, wherein said extensible mask layer has a thickness of about 0.3 mil to about 3 mils.

14. A sheet material according to claim 7, wherein said non-extensible carrier layer comprises a.polyethylene terephthalate film.

15. A sheet material according to claim 7, wherein said paint film comprises a single layer of a pigmented polymer.

16. A sheet material according to claim 7, wherein said paint film comprises a clear coat layer of a transparent weatherable polymer forming said outer surface and an underlying color coat layer of a pigmented polymer forming said inner surface of the paint film.

17. A sheet material according to claim 16, further comprising a color adjustment layer between said clear coat layer and said color coat layer.

18. A sheet material according to claim 7, further comprising a thermoformable backing layer bonded to said inner surface of said paint film, said thermoformable backing layer being selected from the group consisting thermoplastic olefin, acrylonitrile-butadiene-styrene terpolymer, polypropylene, thermoplastic polyimide, polyethylene oxide, polycarbonate, polyvinyl chloride, polystyrene, styrene/polyphenylene oxide, polybutylene terephthalate, nylon, PETG copolyester, and mixtures, laminates and copolymers thereof.

19. A preform for in-mold surfacing of a part, said preform comprising the sheet material according to claim 7 thermoformed into a three-dimensional configuration, said outer surface of said paint film having a 60 degree gloss of less than about 30 after removal of said mask layer.

20. A preform according to claim 19, wherein said outer surface of said paint film has a 60 degree gloss of less than about 20 after removal of said mask layer.

21. A composite shaped part comprising the preform according to claim 19, and a substrate of a thermoplastic polymer conforming to the three dimensional configuration of said preform and adhered thereto.

22. A flexible, weatherable decorative sheet material useful in lieu of painting for providing a decorative finish for parts, comprising:
- a decorative paint film, said paint film having an inner surface and a weatherable outer surface suitable for forming an exterior finish for a part, and
- an extensible mask layer releasably adhered to said outer surface of said paint film to form a protective film overlying said paint film, said mask layer comprising a film-forming polymer component and at least one inert particulate filler dispersed in said polymer component, said filler comprising fumed silica at a concentration at least about 0.5 weight percent on a dry solids basis, said fumed silica having a particle size of about 2 to about 20 microns.

23. A sheet material according to claim 22, wherein said fumed silica is present at a concentration of at least about 1.0 weight percent of said mask layer on a dry solids basis.

24. A sheet material according to claim 22, wherein said film-forming polymer component comprises a dried film of an aliphatic or aromatic polyurethane solution or dispersion.

25. A sheet material according to claim 22, wherein said paint film comprises a single layer of pigmented polymer composition, said polymer composition comprising an alloy of a fluoropolymer composition and an acrylic polymer composition.

26. A sheet material according to claim 22, wherein said paint film comprises a clear coat layer of a transparent weatherable alloy of a fluoropolymer composition and an acrylic polymer composition forming said outer surface and an underlying color coat layer of a pigmented polymer composition forming said inner surface of the paint film.

27. A flexible, weatherable decorative sheet material useful in lieu of painting for providing a decorative finish for parts, comprising:
- a thermoformable decorative paint film, said paint film having an inner surface and a weatherable outer surface suitable for forming an exterior finish for a part, said paint film comprising a clear coat layer of a transparent weatherable alloy of a fluoropolymer composition and an acrylic polymer composition forming said outer surface and an underlying color coat layer of a pigmented polymer composition forming said inner surface of the paint film,
- an extensible mask releasably adhered to said outer surface of said paint film to form a protective film overlying said paint film, said mask layer comprising a polyurethane film-forming polymer component and at least one particulate filler at a concentration at least about 0.5 weight percent on a dry solids basis, said particulate filler having a particle size of about 2 to about 20 microns,
- an adhesive layer overlying said inner surface of said paint film, and
- a thermoformable backing layer formed of a thermoplastic olefin composition adhered to said inner surface of said paint film by said adhesive layer.

28. A sheet material according to claim 27 additionally comprising a non-extensible carrier layer releasably adhered to said extensible mask layer.

* * * * *